(12) United States Patent
Hayasaka

(10) Patent No.: US 7,158,114 B2
(45) Date of Patent: Jan. 2, 2007

(54) FORCE-FEEDBACK INPUT DEVICE

(75) Inventor: Satoshi Hayasaka, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 485 days.

(21) Appl. No.: 10/800,609

(22) Filed: Mar. 15, 2004

(65) Prior Publication Data

US 2004/0195987 A1 Oct. 7, 2004

(30) Foreign Application Priority Data

Mar. 19, 2003 (JP) .............................. 2003-076091

(51) Int. Cl.
*G09G 5/00* (2006.01)
*G06F 3/30* (2006.01)

(52) U.S. Cl. ...................... 345/156; 345/161; 715/701; 715/702

(58) Field of Classification Search ................ 345/156, 345/161, 163, 173, 184; 715/700–702; 298/1 V, 298/21 R; 463/37, 38, 43; 320/118, 144
See application file for complete search history.

(56) References Cited

U.S. PATENT DOCUMENTS 5,929,607 A * 7/1999 Rosenberg et al. ......... 320/166
6,348,911 B1 * 2/2002 Rosenberg et al. ......... 345/161
7,038,657 B1 * 5/2006 Rosenberg et al. ......... 345/156

FOREIGN PATENT DOCUMENTS

JP 2002-149324 5/2002

* cited by examiner

*Primary Examiner*—Henry N. Tran
(74) *Attorney, Agent, or Firm*—Brinks Hofer Gilson & Lione

(57) ABSTRACT

A force-feedback input device includes an operating unit to be operated by an operator, a position detector for detecting an operating state of the operating unit, a torque generator for applying a force to the operating unit, a controller for controlling the driving of the torque generator so that a force in accordance with the operating state is applied to the operating unit, an ambient thermometer for detecting the ambient temperature of the torque generator, a storage unit, and a power supply. The controller calculates a new estimated temperature of the torque generator based on higher one of the ambient temperature, and an estimated temperature immediately before the power stoppage, which is read from the storage unit, and reduces the current supplied to the torque generator to cool the torque generator when the new estimated temperature exceeds a predetermined value.

2 Claims, 6 Drawing Sheets

FORCE-FEEDBACK INPUT DEVICE

This application claims the benefit of priority to Japanese Patent Application No. 2003-076091, herein incorporated by reference.

BACKGROUND OF THE INVENTION

1. Field of the Invention

The present invention relates to a force-feedback input device that applies, to an operating unit, a force in accordance with the operating state of the operating unit, and more particularly, to means for preventing overheating of a torque generator that applies a force to the operating unit.

2. Description of the Related Art

Conventionally, a force-feedback input device is applied to, for example, a central control device for car-mounted electric devices, a steering device, a gearshift device, or a brake device. The force-feedback input device includes an operating unit to be operated by an operator, a position detector for detecting an operating state of the operating unit, a torque generator for applying a force to the operating unit, and a controller for controlling the driving of the torque generator according to position information output from the position detector so that a force in accordance with the operating state of the operating unit is applied to the operating unit, as disclosed in, for example, FIG. 3 of Japanese Unexamined Patent Application Publication No. 2002-149324.

In this force-feedback input device, since various forces in accordance with the direction, amount, or the like of the operation can be applied to the operating unit by driving the torque generator, a required tactile sensation can be given to the operator of the operating unit in various devices.

In a force-feedback input device applied to a steering device or the like, since a driving current is frequently supplied to the torque generator while the vehicle is running, the torque generator is apt to overheat, and various problems may be caused by the overheating; for example, the torque generator may be damaged, may give off smoke, or may ignite.

In order to prevent such problems, the present applicant previously proposed a force-feedback input device shown in FIG. 4. The force-feedback input device includes an operating unit 1 to be operated by an operator, a position detector 2 for detecting the operating state of the operating unit 1, a torque generator 3 for applying a force to the operating unit, a controller 4 for controlling the driving of the torque generator 3 according to position information output from the position detector 2 so that a force in accordance with the operating state is applied to the operating unit 1, an ambient thermometer 5 for detecting the ambient temperature of the torque generator 3, and a power supply 7 for supplying power to the position detector 2, the torque generator 3, the controller 4, and the ambient thermometer 5. The controller 4 calculates an estimated temperature (motor-temperature information) of the torque generator 3 on the basis of the current (motor-current information) supplied to the torque generator 3 and ambient-temperature information (ambient temperature) detected by the ambient thermometer 5, and wherein the current supplied to the torque generator 3 is reduced when the calculated estimated temperature exceeds a predetermined value.

That is, in this force-feedback input device, as shown in FIG. 5, when the power supply 6 is started, first, an ambient temperature $\theta r$ is read from the ambient thermometer 5, and the initial temperature $\theta m$ of the torque generator 3 is set at the ambient temperature $\theta r$. Next, operations of reading the ambient temperature $\theta r$ from the ambient thermometer 5 and reading the motor current I supplied to the torque generator 3 are repeated at fixed intervals of $\Delta t$, and an estimated temperature $\Delta m$ of the torque generator 3 is calculated using the expression $\theta m = \theta m + (I^2 R \cdot \alpha(\theta m \cdot \theta r))\Delta t/\gamma$. In the above expression, R represents the internal resistance of the torque generator 3, I represents the current supplied to the torque generator 3, $\alpha$ represents the heat transfer rate of the torque generator 3, $\theta$ represents the difference between the temperature of the torque generator 3 and the ambient temperature, and $\gamma$ represents the heat storage rate of the torque generator 3. When the calculated estimated temperature of the torque generator 3 is less than or equal to a predetermined value, the above processes are repeated. When the calculated estimated temperature exceeds the predetermined value, the current supplied to the torque generator 3 is reduced, and the above processes are then repeated.

In the above-described force-feedback input device, since the current supplied to the torque generator 3 is reduced when the calculated estimated temperature $\theta m$ of the torque generator 3 exceeds the predetermined value, the torque generator 3 can be prevented from overheating. Moreover, even when the temperature of the torque generator 3 reaches the predetermined value, the supply of the driving power to the torque generator 3 is continued, and the force applied to the operating unit 1 is not suddenly removed from or applied to the operating unit 1, which is different from the case in which the supply of the driving power to the torque generator is stopped when the temperature of the torque generator reaches the predetermined value. Therefore, the operating unit 1 can be operated stably and easily. In addition, since the temperature of the torque generator 3 is not actually measured with a temperature sensor attached to the torque generator 3, but the estimated temperature $\theta m$ of the torque generator 3 is calculated with the ambient thermometer 5 mounted to, for example, a vehicle, the configuration of the force-feedback input device can be simplified, and the cost can be reduced.

However, when the current I supplied to the torque generator 3 is controlled based on the estimated temperature $\theta m$ calculated from the ambient temperature $\theta r$, in a case in which the power supply 7 for supplying the driving current to the torque generator 3 is restarted after being stopped, and the period between the stoppage and restart is short and the actual temperature of the torque generator 3 is higher than the ambient temperature $\theta r$, the estimated temperature $\theta m$ is calculated as a value lower than the actual temperature, as shown in FIG. 6. As a result, it is impossible to reliably prevent the above-described various problems resulting from overheating of the torque generator 3.

SUMMARY OF THE INVENTION

The present invention has been made to overcome such problems of the conventional art, and an object of the present invention is to provide a force-feedback input device that can reliably prevent overheating of a torque generator without reducing operation stability of an operating unit.

In order to overcome the above problems, according to an aspect, the present invention provides a force-feedback input device including an operating unit to be operated by an operator, a position detector for detecting an operating state of the operating unit, a torque generator for applying a force to the operating unit, an ambient-temperature measuring means for measuring the ambient temperature of the torque generator, a controller for controlling the driving of the torque generator according to position information output from the position detector so that a force in accordance with the operating state of the operating unit is applied to the operating unit, and for calculating an estimated temperature of the torque generator on the basis of a current supplied to the torque generator and the ambient temperature from the ambient-temperature measuring means, a storage unit for storing the estimated temperature calculated by the controller, and a power supply for supplying power to the position detector, the torque generator, the controller, and the storage unit. When the power supply is restarted after being stopped, the controller compares an estimated temperature immediately before the power supply is stopped, the estimated temperature stored in the storage unit, and the ambient temperature from the ambient-temperature measuring unit, and calculates a new estimated temperature with reference to higher one of the estimated temperature and the ambient temperature.

By thus storing the estimated temperature of the torque generator in the storage unit and calculating a new estimated temperature with reference to higher one of the estimated temperature immediately before the power supply is stopped, the temperature being stored in the storage unit, and the ambient temperature measured by the ambient-temperature measuring means when the power supply is restarted after being stopped, even in a case in which the period between the stoppage and restart of the power supply is short and the actual temperature of the torque generator is higher than the ambient temperature, an estimated temperature equal to or higher than the actual temperature of the torque generator can be obtained, and various problems resulting from overheating of the torque generator can be prevented reliably.

Preferably, the controller reduces the current supplied to the torque generator when the calculated estimated temperature exceeds a predetermined value.

By thus calculating the estimated temperature of the torque generator by the controller and reducing the current supplied to the torque generator when the calculated estimated temperature exceeds a predetermined value, the amount of heat generated by the torque generator can be limited, and various problems resulting from overheating of the torque generator can be prevented. In addition, since the supply of the driving power to the torque generator is not stopped, and the force application to the operating unit is continued, operation stability of the operating unit can be maintained.

Further objects, features and advantages of the present invention will become apparent from the following description of the preferred embodiments with reference to the attached drawings.

DESCRIPTION OF THE PREFERRED EMBODIMENTS

Figure 1:
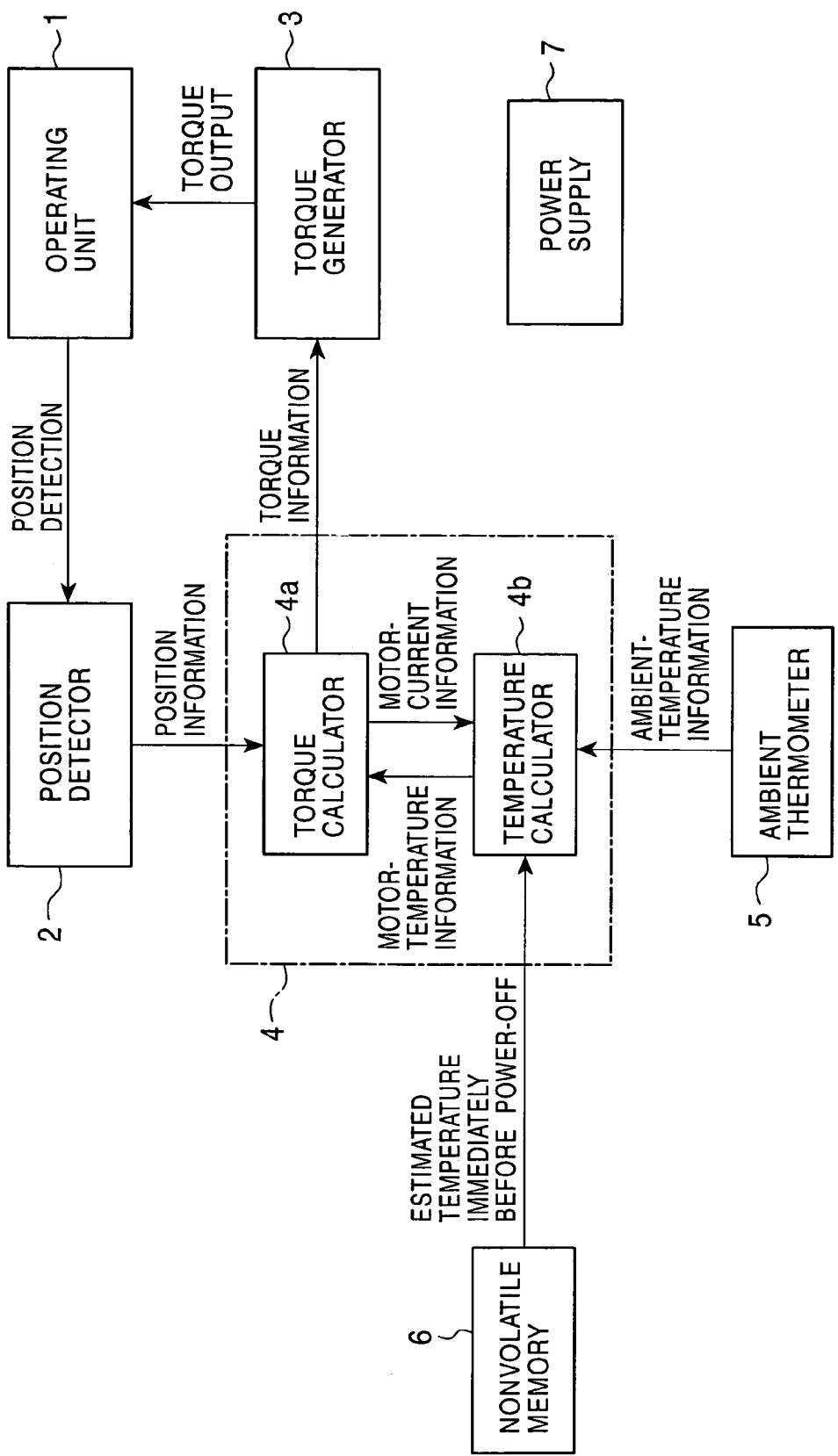
FIG. 1 is a structural view of a force-feedback input device according to an embodiment of the present invention.
Figure 2:
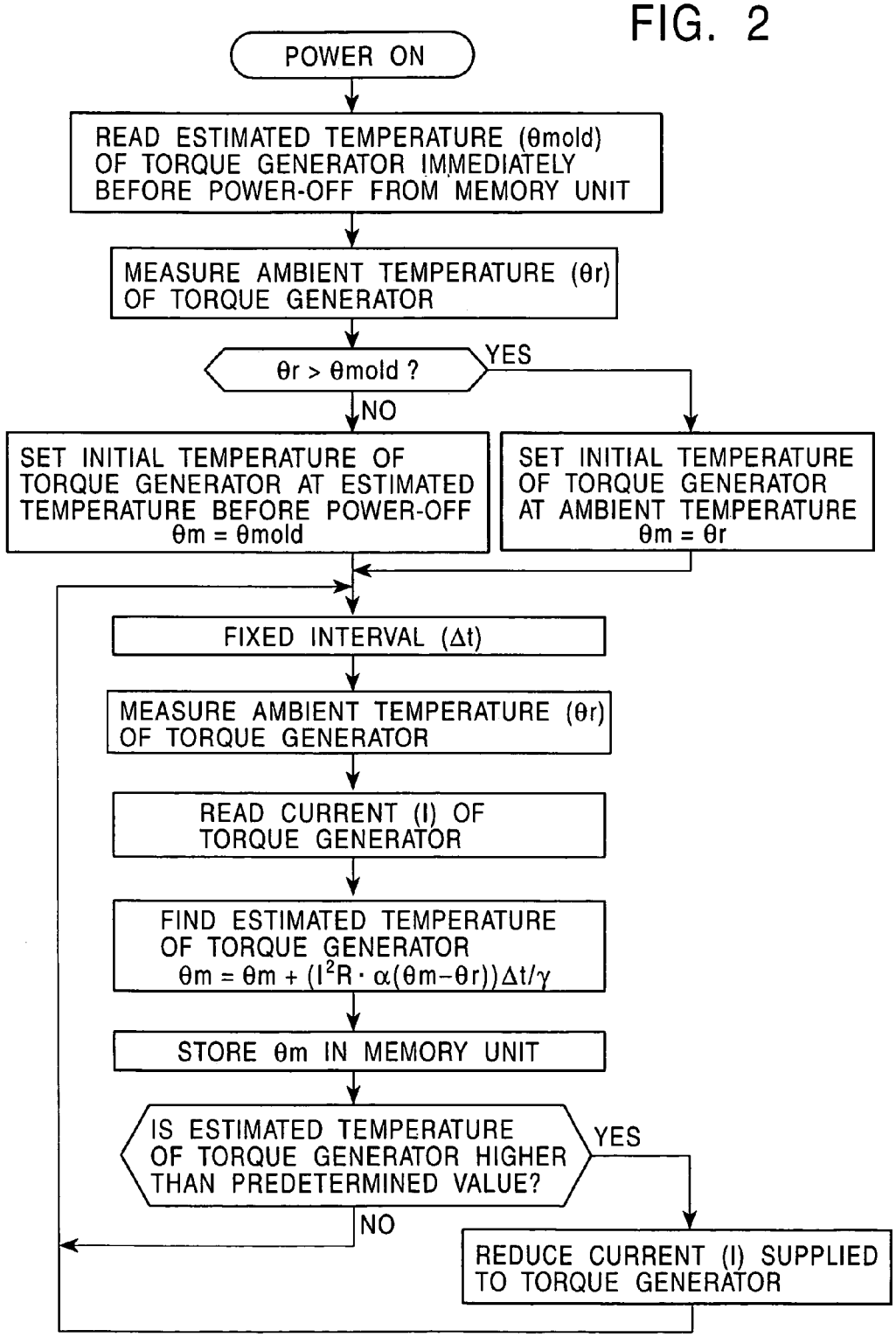
FIG. 2 is a flowchart showing the procedure for controlling the driving current applied to a torque generator in the force-feedback input device of the embodiment.
Figure 3A:
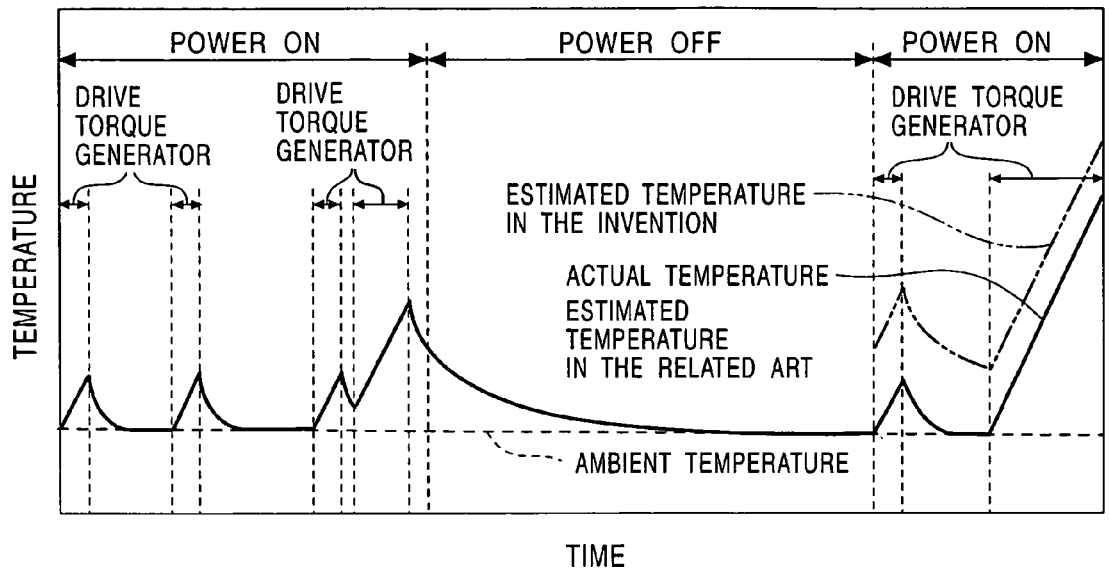
FIGS. 3A and 3B are graphs showing the advantages of the force-feedback input device of the embodiment.
Figure 3B:
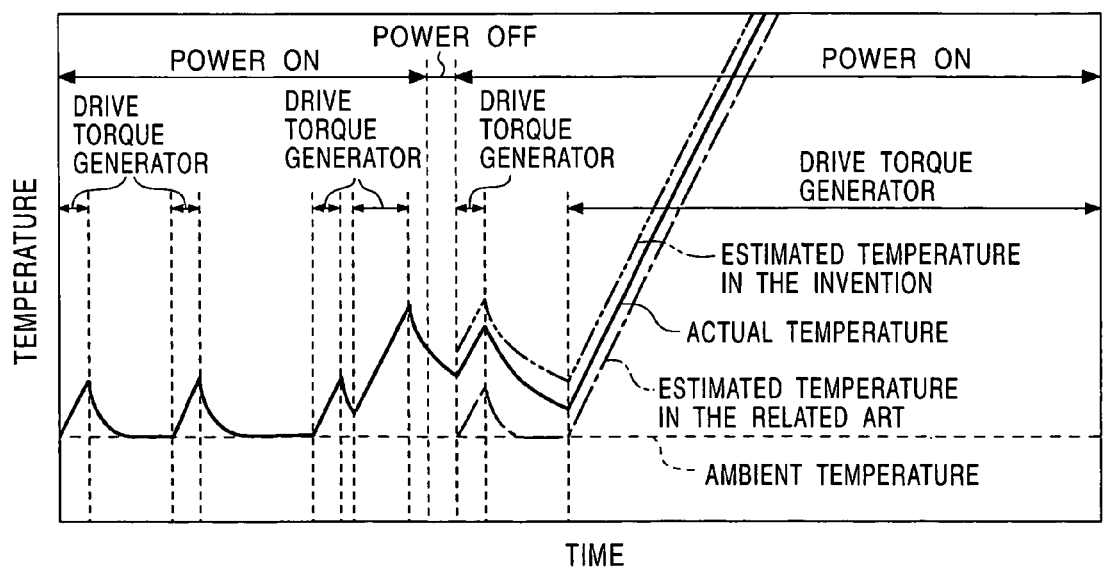
Figure 4:
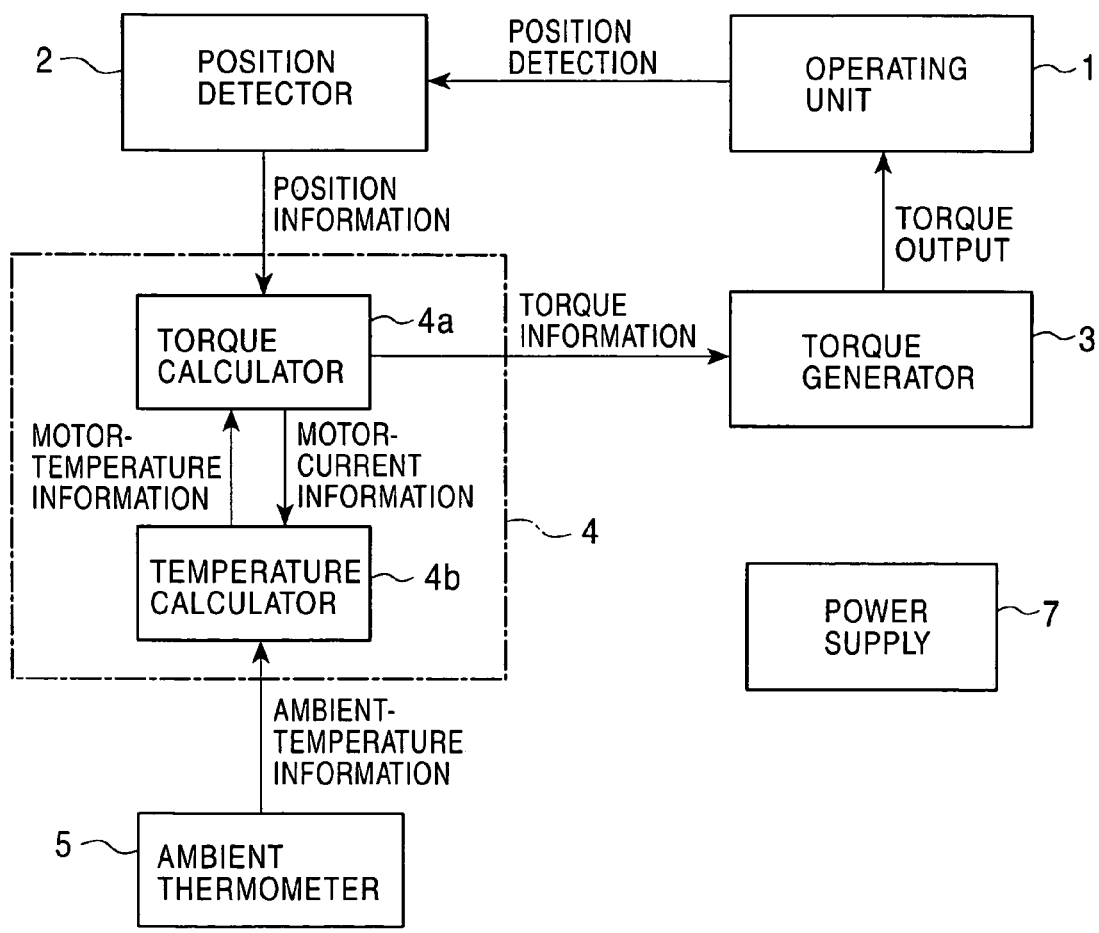
FIG. 4 is a structural view of a known force-feedback input device.
Figure 5:
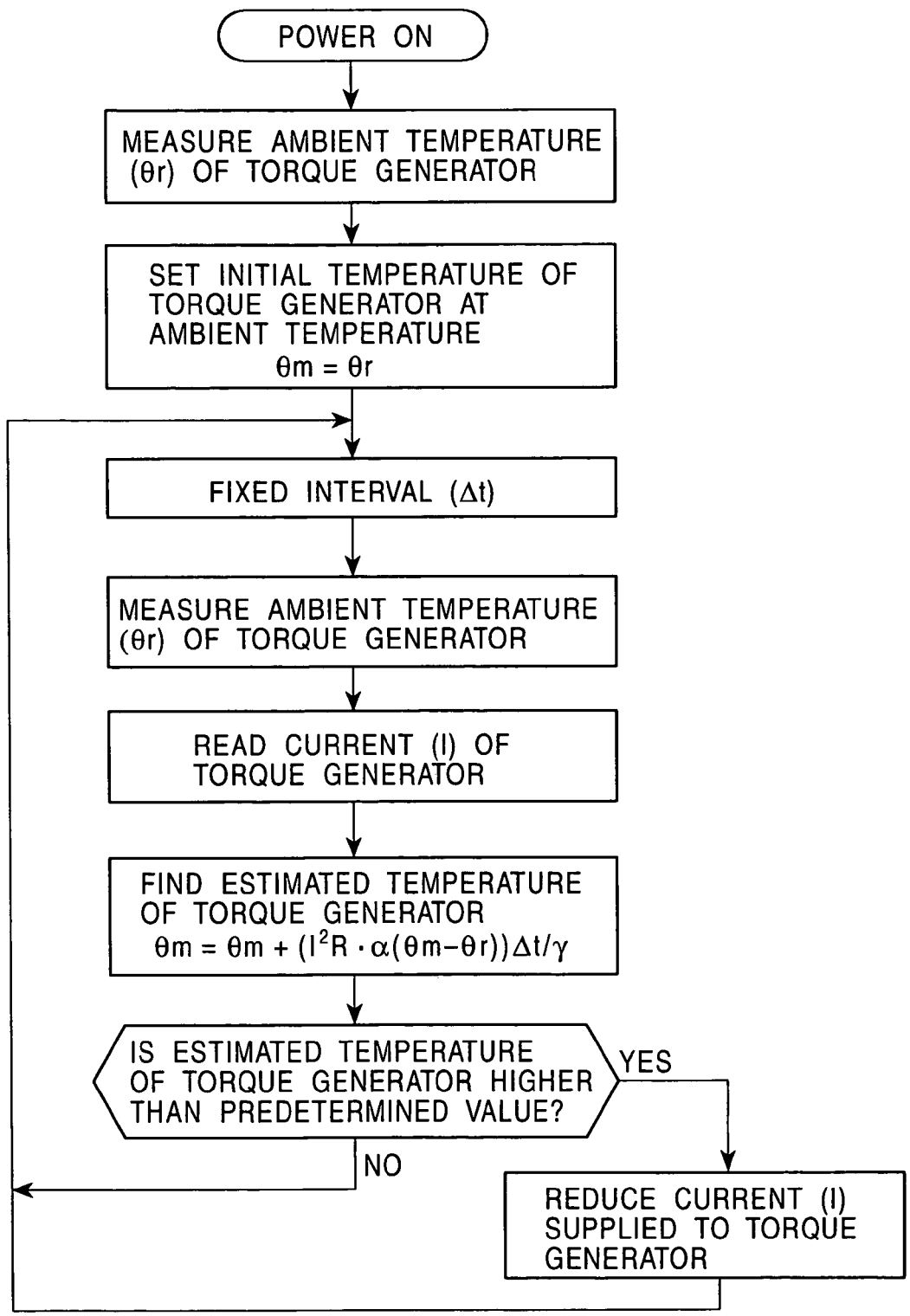
FIG. 5 is a flowchart showing the procedure for controlling the driving current applied to a torque generator in the known force-feedback input device.
Figure 6:
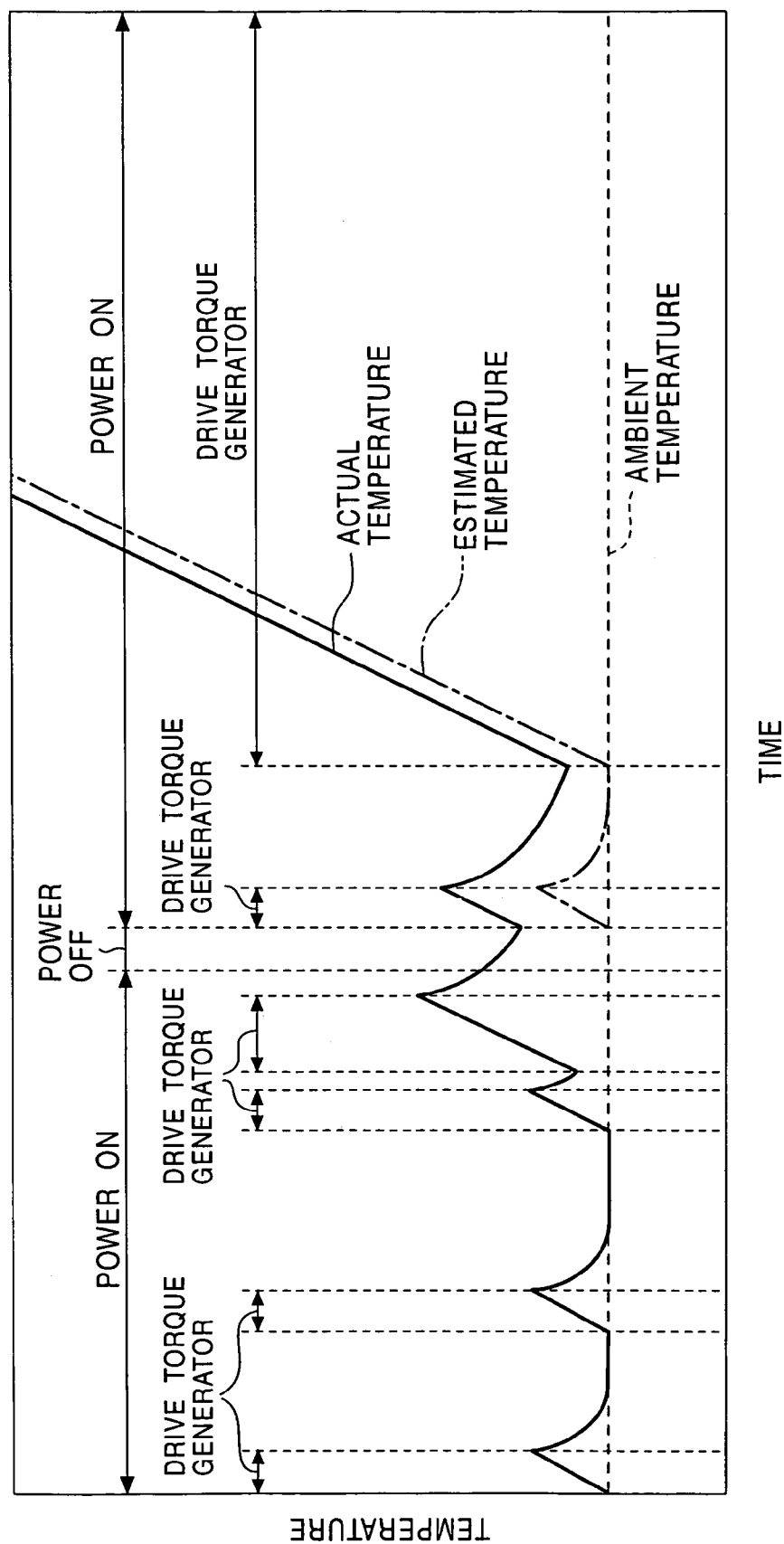
FIG. 6 is a graph showing problems caused by the known force-feedback input device.

A force-feedback input device according to an embodiment of the present invention will be described below with reference to FIGS. 1 to 3. FIG. 1 is a structural view of a force-feedback input device of this embodiment, FIG. 2 is a flowchart showing the procedure for controlling the driving current applied to a torque generator in the force-feedback input device of the embodiment, and FIGS. 3A and 3B are graphs showing the advantages of the force-feedback input device of the embodiment.

As shown in FIG. 1, the force-feedback input device of this embodiment mainly includes an operating unit 1 to be operated by an operator, a position detector 2 for detecting the operating state of the operating unit 1, a torque generator 3 for applying a force to the operating unit, a controller 4 for controlling the driving of the torque generator 3 so that a force in accordance with the operating state of the operating unit 1 is applied to the operating unit 1, an ambient thermometer 5 serving as an ambient-temperature measuring means for detecting the ambient temperature of the torque generator 3, a storage unit 6, and a power supply 7 for supplying power to the position detector 2, the torque generator 3, the controller 4, the ambient thermometer 5, and the storage unit 6.

The operating unit 1 is manually operated by the operator, and, for example, a rotary knob, a swing lever, or a joystick is appropriately used according to the application of the force-feedback input device.

The position detector 2 converts the amount and direction of operation of the operating unit 1 into the amount of electricity, and outputs the converted amount. For example, an encoder or a potentiometer is used.

The torque generator 3 applies a required force to the operating unit 1, and is, for example, a rotary motor, a linear motor, or a solenoid. When the torque generator 3 is a linear motor or a solenoid, a required power transmission mechanism is provided between the torque generator 3 and the operating unit 1 to convert the rotational motion of the torque generator 3 into the linear motion and to transmit the motion.

The ambient thermometer 5 outputs the ambient temperature of the torque generator 3 in the form of the amount of electricity, and is, for example, a thermistor or a ceramic thermometer. In a car-mounted force-feedback input device, the ambient thermometer 5 may be attached to a vehicle so as to also function as a thermometer used, for example, to control an air conditioner.

The storage unit 6 stores an estimated temperature of the torque generator 3 calculated by the controller 4, which will be described later, immediately before the power supply 7 is stopped. The storage unit 6 is, for example, a nonvolatile semiconductor memory.

The controller 4 includes a torque calculator 4a and a temperature calculator 4b, as shown in FIG. 1. The torque calculator 4a finds torque information serving as control information for the torque generator 3 on the basis of position information output from the position detector 2, and controls the driving of the torque generator 3 to apply, to the operating unit 1, a force in accordance with the operation. As a technique for applying a required force to the operating unit 1, the technique disclosed in Japanese Unexamined Patent Application Publication No. 2002-149324 that was previously proposed by the present applicant may be used. The actuator control system, the manual operating unit 3, the actuator 14, and the encoder 25 disclosed in the above publication correspond, respectively, to the torque calculator 4a, the operating unit 1, the torque generator 3, and the position detector 2 in this application. On the other hand, the temperature calculator 4b calculates a new estimated temperature of the torque generator 3 on the basis of motor-current information output from the torque calculator 4a, ambient-temperature information output from the ambient thermometer 5, and the estimated temperature immediately before the power stoppage that is read from the storage unit 6. The temperature calculator 4b outputs the calculated estimated temperature as motor-temperature information to the torque calculator 4a so as to correct the torque information found by the torque calculator 4a. More specifically, when the new estimated temperature of the torque generator 3 exceeds a predetermined value, the current supplied to the torque generator 3 is reduced to cool the torque generator 3.

That is, in the force-feedback input device of this embodiment, as shown in FIG. 2, when the power supply 7 is started, first, an estimated temperature θmold immediately before the power stoppage is read from the storage unit 6, an ambient temperature θr is fetched from the ambient thermometer 5, and it is determined whether the ambient temperature θr is higher than the estimated temperature θmold. When it is determined that the ambient temperature θr is higher than the estimated temperature θmold, an initial temperature θm of the torque generator 3 is set at the ambient temperature θr, operations of fetching the ambient temperature θr from the ambient thermometer 5 and obtaining the motor current I supplied to the torque generator 3 are repeated at fixed intervals of Δt, and an estimated temperature θm of the torque generator 3 is calculated using the expression $\theta m = \theta m + (I^2 R \cdot \alpha(\theta m \cdot \theta r))\Delta t/\gamma$. In the above expression, R represents the internal resistance of the torque generator 3, I represents the current supplied to the torque generator 3, α represents the heat transfer rate of the torque generator 3, θ represents the difference between the temperature of the torque generator 3 and the ambient temperature, and γ represents the heat storage rate of the torque generator 3.

When it is determined that the estimated temperature θmold immediately before the power stoppage is higher than the ambient temperature θr, the initial temperature θm of the torque generator 3 is set at the estimated temperature θmold, operations of fetching the ambient temperature θr from the ambient thermometer 5 and obtaining the motor current I supplied to the torque generator 3 are repeated at fixed intervals of Δt, and an estimated temperature θm of the torque generator 3 is calculated using the above expression.

Subsequently, the calculated estimated temperature θm of the torque generator 3 is stored in the storage unit 6, and it is determined whether the calculated estimated temperature θm of the torque generator 3 is higher than the predetermined value. When the calculated estimated temperature θm of the torque generator 3 is lower than or equal to the predetermined value, the above processes are repeated. When the calculated estimated temperature θm exceeds the predetermined value, the current supplied to the torque generator 3 is reduced, and the above processes are then repeated.

The force-feedback input device having this configuration has advantages equivalent to those of the force-feedback input device previously proposed by the present applicant. Furthermore, the estimated temperature θm of the torque generator 3 immediately before the power supply 7 is stopped is stored in the storage unit 6, and the controller 4 calculates a new estimated temperature based on higher one of the estimated temperature θm read from the storage unit 6 and the ambient temperature θr, when the stopped power supply 7 is restarted. Therefore, as shown in FIGS. 3A and 3B, not only in a case in which the period between the stoppage and restart of the power supply 7 is long and the actual temperature of the torque generator 3 is lower than the ambient temperature, but also in a case in which the period between the stoppage and restart of the power supply 7 is short and the actual temperature of the torque generator 3 is higher than the ambient temperature, an estimated temperature higher than or equal to the actual temperature of the torque generator 3 can be obtained, and various problems resulting from overheating of the torque generator 3 can be prevented reliably.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A force-feedback input device comprising:
   an operating unit to be operated by an operator;
   a position detector for detecting an operating state of the operating unit;
   a torque generator for applying a force to the operating unit;
   an ambient-temperature measuring unit for measuring an ambient temperature of the torque generator;
   a controller for controlling driving of the torque generator according to position information output from the position detector so that a force in accordance with the operating state of the operating unit is applied to the operating unit, and for calculating an estimated temperature of the torque generator on the basis of a current supplied to the torque generator and the ambient temperature output from the ambient-temperature measuring unit;
   a storage unit for storing the estimated temperature calculated by the controller; and
   a power supply for supplying power to the position detector, the torque generator, the controller, and the storage unit,
   wherein, when the power supply is restarted after being stopped, the controller compares an estimated temperature immediately before the power supply is stopped, the estimated temperature stored in the storage unit, and the ambient temperature output from the ambient-temperature measuring unit, and calculates a new estimated temperature with reference to higher one of the estimated temperature and the ambient temperature.

2. A force-feedback input device according to claim 1, wherein the controller reduces the current supplied to the torque generator when the calculated estimated temperature exceeds a predetermined value.

* * * * *